Oct. 24, 1939.   E. BUSSE   2,177,360
OPTICAL IMAGE INTENSIFIER
Filed July 3, 1936
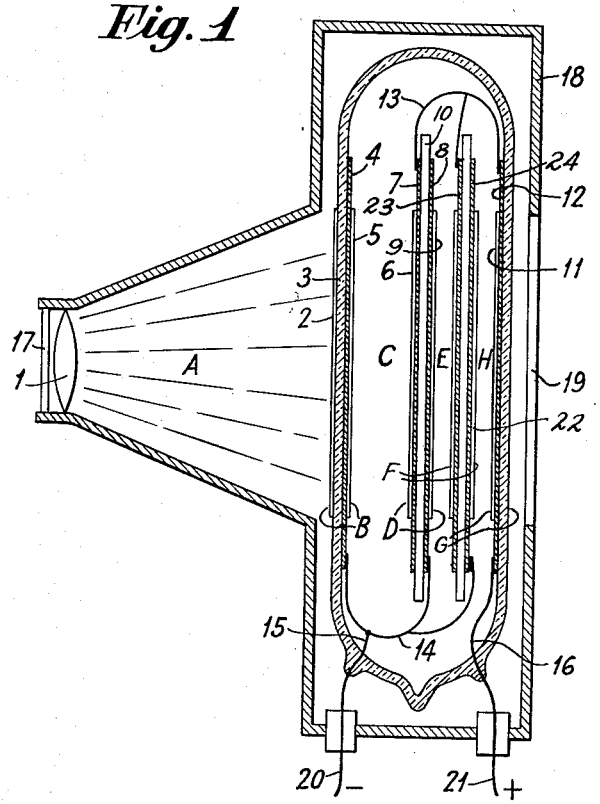
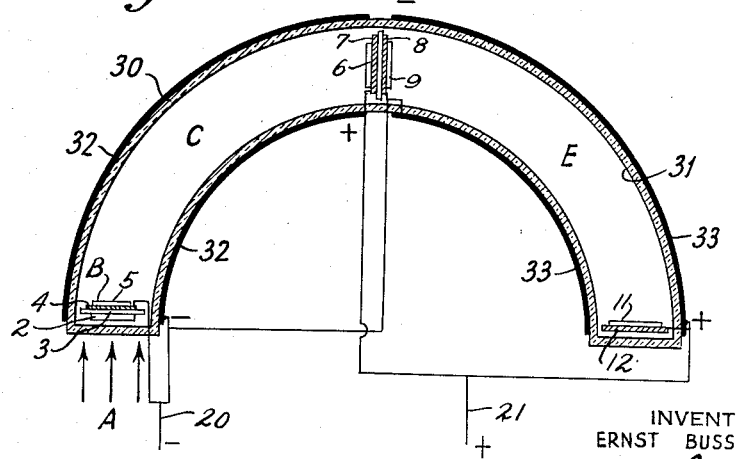
INVENTOR
ERNST BUSSE
BY
ATTORNEY Patented Oct. 24, 1939

2,177,360

UNITED STATES PATENT OFFICE 2,177,360

OPTICAL IMAGE INTENSIFIER

Ernst Busse, Hamburg, Germany, assignor to N. V. Philips' Gloeilampenfabrieken, Eindhoven, Netherlands, a corporation of the Netherlands Application July 3, 1936, Serial No. 88,743
In Germany July 23, 1935

6 Claims. (Cl. 250—166)

My invention relates broadly to devices for intensifying optical images, and more particularly to an electron tube arrangement with associated means designed to cooperate with the electronic means for intensifying or amplifying the optical brilliance of an image.

Broadly speaking, my invention comprises a device having an envelope, the latter having arranged therein means responsive to optical values, and at the other extremity of the envelope is placed a fluorescent screen which is responsible to electron bombardment. Intermediate these arrangements is placed a plurality of transparent electrode members having a fluorescing substance on one side thereof and a photoelectric substance on the other side thereof. Each of these electrodes is energized by an appropriate source of energy so as to accelerate the the electron image formed on any of the photo-electric surfaces toward an opposing fluorescing surface. It will be appreciated that the light given off by one of the fluorescing screens might act on an extraneous member, particularly a neighboring member, and therefore the screens may be arranged so that their optical response is out of the particular portion of the spectrum of the remaining screens, or the transparent members may themselves act as light filters.

It will be appreciated that for accelerating purposes either electric or magnetic fields or a combination of the two may be used. It will also be appreciated that the fields between any two of the co-operative members, that is to say, a photoelectric surface and a fluorescing surface, may be equal in intensity or may be staggered in any desired relationship.

The optical image may be within the visible range of the spectrum, but on the other hand it may just as well be invisible as, for instance, infra-red or ultra-violet.

The invention will best be understood by reference to the accompanying drawing in which Figure 1 shows an embodiment of my invention housed in a vacuum tube.

Figure 2 shows another embodiment of my invention in which the envelope of the tube is curved to prevent inter-image area disturbances.

Referring to Fig. 1, A designates the primary beam of rays comprising the optical image, which may be projected through the lens 1 onto an image area B and produces an image in a fluorescent layer 2. The light issuing from this layer passes through the wall 3 of the vacuum vessel which wall also serves as a layer carrier and through a thin metal layer 4 onto a photo-sensitive layer 5 from which it dislodges electrons which are directed by the electric fields C on to the image area D. It is obvious, of course, that the primary image can be projected directly onto the photo-electric layer 5. The fluorescent layer 6 will light up so as to be materially brighter than the luminous layer 2 since there is a high voltage between the electrodes 4 and 7. 7 and 8 designate metal deposits comprising electrodes, and the layer 9 is another photo-electric deposit and the mica plate 10 which is secured in the vessel by known means serves as a carrier of the system. The electrons dislodged in the layer 9 travel through the field E and impinges onto the fluorescing layer of the image area F. The light thus formed releases electrons from the photoelectric layer 22 which travel through the field H and impinge on the image screen G. The screen G is the observing screen and is formed by a luminous layer 11 and a metal deposit 12, both of them being applied to the wall of the vacuum vessel. The metal deposits 4, 7, 8, 23, 24 and 12 are connected by wires 13 and 14 and are led from the vacuum vessel by means of leads 15 and 16.

In order to prevent radiation given off by the layer 6 for instance, from dislodging electrons in the photo-electric material 5, the latter may be constructed, for example, essentially as a red-sensitive layer with caesium as the active substance, whereas the layer 6 may be caused to emit blue light only by the use of a calcium-tungstate layer. Accordingly, under these conditions, the layer 2 will preferably be constructed so as to be red-luminous but the photo-electric substance 9 will be made essentially blue-sensitive, for example, a potassium layer. In essentially the same manner, retroaction of the radiation given off by the observation screen 11 on the layer 9 can be avoided by the choice of another color not similar to those mentioned immediately above. The arrangement might be further improved by the arrangement in front of the lens 1 of a filter 17 transmitting only rays that do not act on the fluorescent layer 2 but act, for instance, on the adjoining luminous layers.

The aggregate may be housed in a casing 18 impervious to light which on the rear side has an aperture 19 for observing the image. If necessary, the aperture may be screened by a filter-disc absorbing harmful light from the surrounding space but transmitting the radiation that is given off by the screen 11. The conductors 20 and 21 are connected to a source of direct voltage of the order of magnitude of 1000 volts or over.

Figure 2 shows a similar arrangement. Like parts are designated by references similar to those of Figure 1. The construction of the image areas may be identical to that described with reference to Figure 1. The improvement of this arrangement consists in that the fields C and E are curved and circumscribe a quarter of a circle each so that the fluorescent light given off by an image area cannot strike the neighbouring image areas. Preferably, the wall of the vacuum vessel is provided on the internal surfaces 30 and 31 with a ray-absorbing surface. This permits of using in all of the areas of image fluorescent or photo-electric layers of like kind without there being any danger of undesired mutual influence.

In order that the electrons may be directed in curved paths, as is necessary, the fields C and E are surrounded each by a coating of poor conductivity 32 and 33 respectively to which the same voltage is applied as to the electrodes that generate the fields C and D respectively. The coatings have thus a very feeble current passing through them and produce a suitable potential increase along the electron channel. The electrons are thus directed into concentric paths, as is necessary for a faithful image. The control of the electrons may also be ensured by winding around the electron channel a coil having a direct current passing through it and generating a magnetic field of constant intensity which is superimposed upon the electric field. Lateral electron speeds are suppressed by such a field.

For purposes of simplicity, only one image area has been shown as being interposed between the screen on which the original image falls and identified as 2, and the observing screen which is identified as 11. The principle, of course, remains the same as where a plurality of these image areas are used.

What I claim is:

1. A light image amplifier and converter comprising an envelope, a photo-cathode mounted adjacent an inner wall of said envelope and a fluorescent screen electrode mounted adjacent another wall of said envelope, and substantially planar electrode means having a fluorescent screen on one side thereof and a photo-cathode on the other side thereof mounted between said photo-cathode and the fluorescing screen electrode and having leads connected thereto.

2. A light image amplifier and converter comprising an envelope, a photo-cathode electrode on one inner wall and a fluorescent screen electrode upon an opposite inner wall of said envelope, planar means having a fluorescent screen on one side thereof and a photo-cathode on the other side thereof mounted between said electrodes and having leads connected thereto, and a fluorescent screen on the outer wall of said envelope juxtaposed to said photo-cathode electrode.

3. A light image amplifier and converter comprising an envelope, a photo-cathode mounted adjacent an inner wall of said envelope, a fluorescent screen electrode mounted adjacent another wall of said envelope, and a plurality of substantially planar electrode means within said envelope having a fluorescent screen on one side thereof and a photo-cathode on the other side thereof mounted between said photo-cathode and the fluorescing screen electrode and having leads connected thereto, said photo-cathodes each having a spectral response differing from the others.

4. A light image amplifier and converter comprising an envelope, a photo-cathode mounted adjacent an inner wall of said envelope, a fluorescent screen electrode mounted adjacent another wall of said envelope, and a plurality of substantially planar electrode means within said envelope having a fluorescent screen on one side thereof and a photo-cathode on the other side thereof mounted between said photo-cathode and the fluorescing screen electrode and having leads connected thereto, said photo-cathodes each having a spectral response differing from that of the others and each of said fluorescing means having a spectral response differing from the others.

5. A light image amplifier and converter comprising an envelope having an arcuate shape, a photo-cathode mounted within and adjacent an inner wall of said envelope and a fluorescent screen electrode mounted adjacent another wall of said envelope, and substantially planar electrode means having a fluorescent screen on one side thereof and a photo-cathode on the other side thereof mounted between said photo-cathode and the fluorescing screen electrode and having leads connected thereto.

6. A light image amplifier and converter comprising an arcuately shaped envelope, a photo-cathode electrode mounted on one inner wall, a fluorescent screen electrode mounted upon an opposite inner wall, planar means having a fluorescent screen on one side thereof and a photo-cathode on the other side thereof mounted between said electrodes and having leads connected thereto, and a fluorescent screen on the outer wall of said envelope juxtaposed to said photo-cathode electrode.

ERNST BUSSE.